Jan. 17, 1961 J. V. FISHER Re. 24,925

CARTON PACKAGE

Original Filed Sept. 9, 1954 2 Sheets-Sheet 1

INVENTOR:
JOHN V. FISHER
BY Bennett & Bennett
ATT'YS

CARTON PACKAGE

Original Filed Sept. 9, 1954 2 Sheets-Sheet 2

INVENTOR:
JOHN V. FISHER
BY
Barnett & Barnett
ATT'YS

United States Patent Office

Re. 24,925
Reissued Jan. 17, 1961

24,925

CARTON PACKAGE

John V. Fisher, deceased, late of Los Angeles, Calif., by Constance M. Fisher, administratrix, Hollywood, Calif., assignor to Container Corporation of America, Chicago, Ill., a corporation of Delaware Original No. 2,889,040, dated June 2, 1959, Ser. No. 454,938, Sept. 9, 1954. Application for reissue July 11, 1960, Ser. No. 42,187

3 Claims. (Cl. 206—65)

Matter enclosed in heavy brackets [ ] appears in the original patent but forms no part of this reissue specification; matter printed in italics indicates the additions made by reissue.

This invention relates to cartons for packaging and displaying canned goods or other products packaged in cylindrical or substantially cylindrical containers. The invention is essentially an improvement on the so-called six-pack cartons such, for example, as is disclosed in U.S. Letters Patent 2,611,527 issued to me on September 23, 1952.

The primary object of the invention is to provide means whereby the filling end of the carton may be closed and locked in the closed position by engagement with the contents of the carton and without the necessity of glue, staples or equivalent anchoring material.

Another object is to provide for the easy opening of a carton of this general type without tearing or otherwise destroying the value of the carton.

These and other objects will more fully appear from the following description and with reference to the accompanying drawings wherein.

The invention is adaptable to any six-sided carton and relates primarily to the closing and locking of one end of the carton. This will normally be the filling end although the invention is applicable to the opposite end. The sides may be solid or partially open, as desired. The end panel opposite the filling end may likewise be either solid or not. Any desired means may be employed for forming the carton and anchoring the four sides and the end panel opposite the filling end. The present invention, as stated, is directed primarily to the closing of the filling end of the carton after it has been filled. This is accomplished, as will hereinafter be more fully described, by providing a pair of closing panels which are adapted to close all or a portion of the filling end, said closing panels being associated with a pair of anchoring flaps hinged to swing vertically with respect to the cans after they are packed in the carton. The radius of each anchoring flap is made somewhat greater than the distance between the hinge line of the flap and the adjacent can so that the anchoring flap may be bent somewhat and forced past said can, whereby the flap is prevented from swinging back past the can and hence the flap and its associated closing panel are locked in the closed position.

Figure 1:
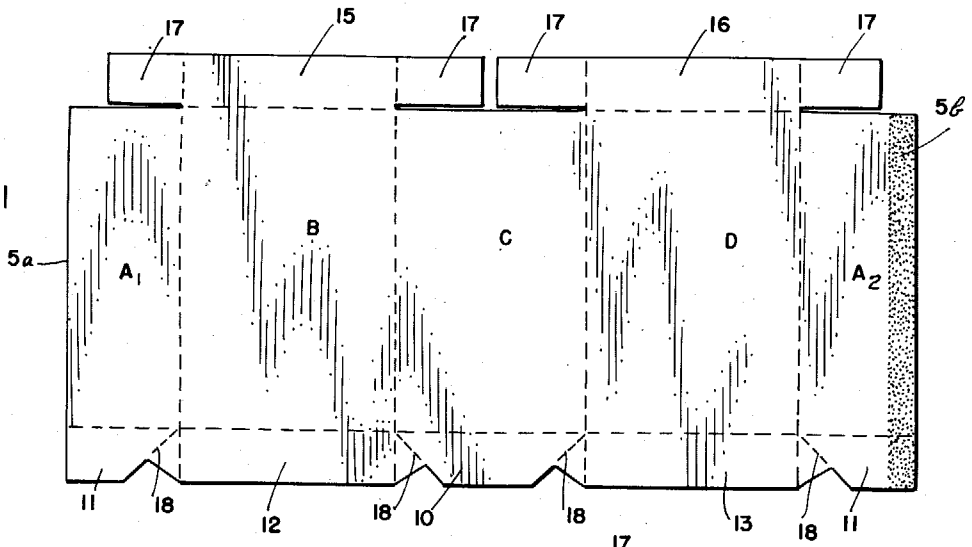
Fig. 1 is a plan view of a carton blank embodying the present invention.
Figure 2:
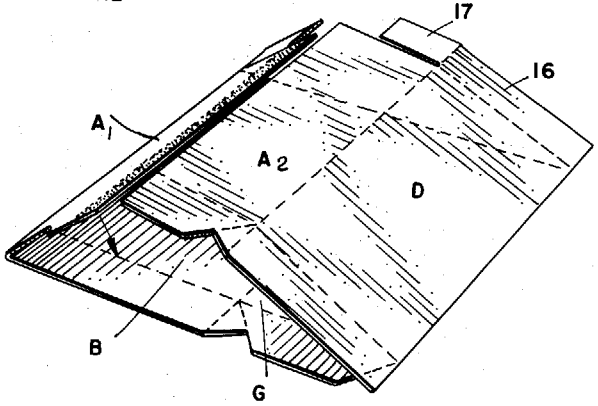
Fig. 2 is a perspective view of the blank illustrating how it is folded to provide a continuous strip prior to the packaging operation.

Referring to Fig. 1 the blank is provided with four parallel fold lines which define the four side panels $A_1$—$A_2$, B, C, and D, panel $A_1$—$A_2$ being initially in two sections, before the ends of the blank are joined, as shown in Fig. 2.

The portion of the blank which becomes the filling end of the carton in the preferred embodiment of the invention (although it could serve equally as the opposite end if desired) consists of the anchoring flap 10, the anchoring flap 11, which is initially in two segments as shown, and the closing panels 12 and 13.

The anchoring flaps and closing panels are hinged to the edges of the panels $A_1$—$A_2$, B, C, and D, as shown, and with respect to each other, for movement inwardly when the ends of the blank are overlapped, as indicated at 5a and 5b, and glued or otherwise secured together, as shown in Fig. 2.

The opposite end of the carton may, as stated, be closed by any desired method. The drawings indicate the conventional glued tab method whereby closing strips 15, 16, each provided with tabs 17, are folded inwardly across the end of the carton and anchored in that position by gluing the tabs 17 to the adjacent side panel of the carton. This provides a two-section end panel 15—16. For a machine operation there may be substituted for the glued tab the automatic anchoring tab assembly as shown in my copending application, Serial No. 454,975, filed September 9, 1954, now Patent No. 2,943,427 which is also a two-section panel. Likewise, if desired, said opposite end may be closed in the same manner as hereinafter described for closing the filling end.

Figure 3:
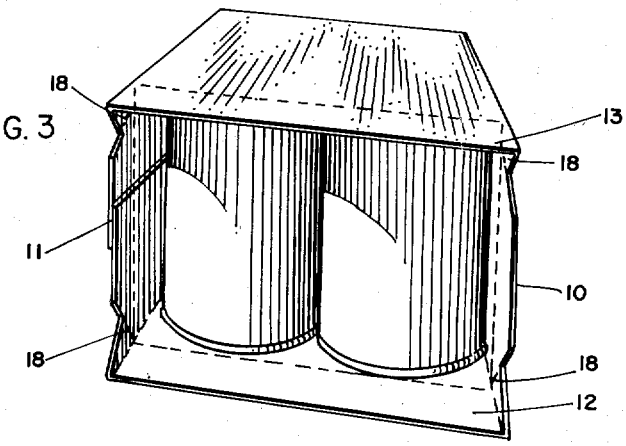
Fig. 3 is a perspective view of the carton formed from the blank shown in Fig. 1 but with the filling end wide open.

The anchoring flaps 10 and 11 are provided with diagonal fold lines 18, each of which begins at one corner of the panel to which the flap is hinged, and thence extends inwardly to the outer edge of the flap at an angle of approximately 45° to said hinge line. This angle may be varied a few degrees one way or the other. The outer portion of each anchoring flap between the diagonal fold line 18 and the adjacent edge of the closing panel is preferably cut away, as shown in Figs. 1, 2 and 3. The primary advantage of a pair of such cut-away notches, horizontally aligned on opposing side panels, is to provide an entrance notch and an exit notch for the opening plows used when the carton is opened and filled mechanically.

Figure 4:
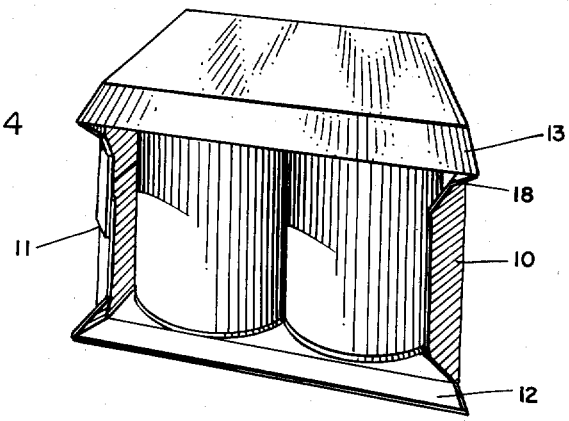
Fig. 4 is a partially cut away perspective view of the carton with the filling end partially closed.
Figure 5:
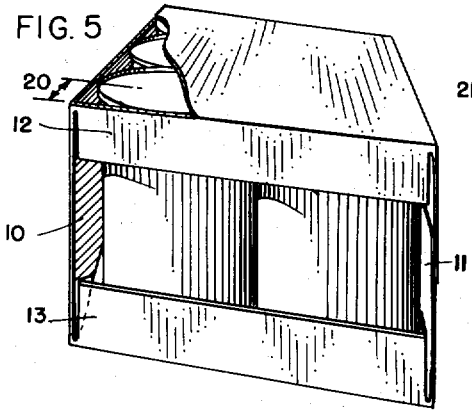
Fig. 5 is a partially cut away perspective view of the carton with the filling end closed.

Referring to Figs. 3 and 4 it will be seen that as anchoring flaps 10 and 11 are folded inwardly, the portion of each flap outside of the diagonal fold lines 18 will fold along fold line 18 and along the flap hinge line, thus drawing the closing panels 12 and 13 across the filling end of the carton and toward the closing position shown in Fig. 5.

When the anchoring flaps 10 and 11 have been swung through 90°, the closing panels 12 and 13 will be approximately at right angles to the side panels of the carton but will not, as yet, be anchored in that position.

Figure 6:
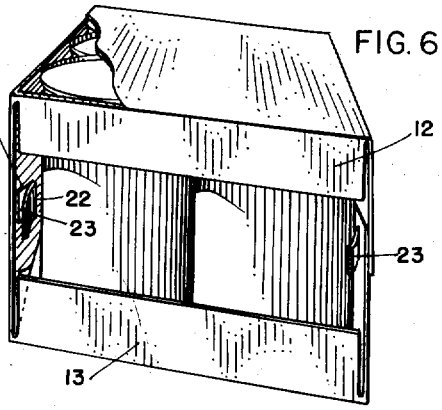
Fig. 6 shows a modified form of the closing flap provided with an ear for easy opening.

As is best shown in Figs. 5 and 6, the radius of each of the anchoring flaps 10 and 11 (by which is meant the distance between the flap hinge line and the outer extremity of each flap) is greater than the distance between the flap hinge line and the nearest surface of the adjacent can. Hence if each *anchoring* [closing] flap is moved inwardly further along its hinge line, the outer end of each flap will first engage the periphery of the can and, upon further movement in the same direction, will bend and then straighten out and be locked against the back of the can.

The practical limitations on the radius of each anchoring flap are, therefore, that it should be greater than the distance between the flap hinge line and the surface of the nearest can, and further, as will be presently explained, it should preferably be less than the radius of the can. If the radius of the anchoring flap were less than the distance between the hinge line and the surface of the adjacent can it would not contact the can and hence could not come into the desired locking engagement therewith. If, on the other hand, the radius of the anchoring flap were greater than the can diameter it would not only be more difficult to force the flap past the can, but it would also unduly cramp the flap behind the can because, as will be noted from Figure 5, the distance 20 from the hinge line to the point where the can abuts against the side of the carton is equivalent to the diameter of the can. The essential factor is that the outer edge of each anchoring flap must, when swung into anchoring position, as above set forth, describe an arc which at intermediate point intersects to a slight degree the arc defined by the circumference of the nearest can.

Fig. 6 illustrates a modification of the flap which provides an answer to the annoying problem of easily opening a carton of this type. A three sided cut 21 in the central portion of each closing flap and a score line 22 at the base of the cut provides a pull tab 23 on each closing flap. A slight pull on each of the pull-tabs 23 will readily return the carton to the open position as shown in Fig. 3. This opening operation, as will be seen, will not tear or injure the carton in any manner and, if desired, the carton may again be promptly and effectively closed and locked simply by replacing the empty or partially empty cans in the carton and pushing the closing flaps back into the locking position as shown in Figs. 5 and 6.

Obviously, the specific embodiment of the closing expedient as above described may be modified in various ways without departing from the scope of the present invention. The embodiment herein described is designed to provide a rather full view of the contents of the carton. If this is not desired, a full closing panel (either double or single) may be used, in which case the anchoring flaps as shown in the drawings would be three-sided cuts in the closing panel (or panels). Further, if desired, similar anchoring flaps would be provided for wedging and locking between the two end cans in the same manner as the illustrated flaps wedge and lock between each end can and the side of the carton. Likewise the closing panels, as illustrated, may be made larger to cover a greater portion of the end of the carton, in which case the anchoring flaps would be shortened. The essential factor is that the anchoring flaps have sufficient area, depending upon the strength and resiliency of the board used, to provide a firm locking engagement. Furthermore, sides and ends may be transposed without departing from the present invention. To that end, the word "panel" as used in the appended claims shall be interpreted broadly to cover any area of the carton material which serves to keep the contents in the carton. Likewise the term "carton" as used in the claims is used in its broadest sense as meaning any kind of package whereby the containers are held together. Obviously the present invention is not limited to a completely enclosed box or, indeed, to a six-sided structure. These and other modifications may be employed without departing from the scope of the invention as set forth in the following claims.

1. A package comprising a group of upright cylindrical cans that are substantially in engagement with each other, a carton having vertical opposed end panels extending over two of the laterally oppositely outwardly facing sides of said group in substantial engagement with one of the sides of the cans at each of said sides of the group, and panel extensions integral with said end panels along their opposite vertical edges but otherwise free from securement to said end panels, said end panel extensions extending into said carton to positions between said end panels and said cans adjacent thereto with said last mentioned cans solely holding said end extensions in their said positions, top and bottom panels extending between and integral with said end panels and extending over the upper and lower ends of the cans of said group substantially in engagement therewith, spaced top and bottom panel extensions respectively on said top and bottom panels extending from end to end thereof along their opposite edges, said top and bottom panel extensions being in substantially coplanar relationship and with their free edges in spaced relation and extending over the laterally facing sides of the cans along the other two opposite sides of said group at the upper and lower ends of said cans only and substantially in engagement with said laterally facing sides, and means integrally connecting side top and bottom panel extensions with said end panel extensions at the ends of the panels carrying them and holding said top and bottom panel extensions in their positions extending over said cans whereby said cans will be held in said carton by said top and bottom panel extensions through their connections with said end panel extensions and by the holding engagement between said end panel extensions and the said cans adjacent thereto.

2. A package comprising a group of upright cylindrical cans that are substantially in engagement with each other, a carton having vertical opposed end panels extending over two of the laterally oppositely outwardly facing sides of said group in substantial engagement with one of the sides of the cans at each of said sides of the group, and panel extensions integral with said end panels along their opposite vertical edges but otherwise free from securement to said end panels, said end panel extensions extending into said carton to positions between said end panels and said cans adjacent thereto with said last mentioned cans solely holding said end extensions in their said positions, top and bottom panels extending between and integral with said end panels and extending over the upper and lower ends of the cans of said group substantially in engagement therewith, spaced top and bottom panel extensions respectively on said top and bottom panels extending along their opposite edges, said top and bottom panel extensions being in substantially coplanar relationship and with their free edges in spaced relation and extending over the laterally facing sides of the cans along the other two opposite sides of said group at the upper and lower ends of said cans only and substantially in engagement with said laterally facing sides, and means integrally connecting said top and bottom panel extensions with said end panel extensions at the ends of the panels carrying them and holding said top and bottom panel extensions in their positions extending over said cans whereby said cans will be held in said carton by said top and bottom panel extensions through their connections with said end panel extensions and by the holding engagement between said end panel extensions and the said cans adjacent thereto.

*3. A package comprising a group of upright cylindrical containers that are substantially in engagement with each other, a carton having vertical opposed end panels extending over two of the laterally oppositely outwardly facing sides of said group in substantial engagement with one of the sides of the containers at each of said sides of the group, and panel extensions integral with said end panels along their opposite vertical edges but otherwise free from securement to said end panels, said end panel extensions extending into said carton to positions between said end panels and said containers adjacent thereto with said last mentioned containers solely holding said end extensions in their said positions, top and bottom panels extending between and secured to said end panels and extending over the upper and lower ends of the containers of said group substantially in engagement therewith, said top and bottom panels and said end panels together defining an end loading carton, at least one of said top and bottom panels having at a side edge thereof extending between said end wall panels a container retaining extension attached thereto and extending over the adjacent end portions only of the laterally facing sides of*

*the containers of said group at said side of said carton and substantially in engagement with said laterally facing sides, and means integrally connecting said container retaining extension with said end panel extension effective for holding said container retaining extension in its position extending over said containers whereby said containers will be held in said carton by said container retaining extension through its connection with said end panel extension and by the holding engagement between said end panel extension and the containers adjacent thereto.*

References Cited in the file of this patent or the original patent

UNITED STATES PATENTS

| | | |
|---|---|---|
| 888,160 | Grochau | May 19, 1908 |
| 2,033,526 | Kinkenon | Mar. 10, 1936 |
| 2,395,558 | Lighter | Feb. 26, 1946 |
| 2,548,985 | Lighter | Apr. 17, 1951 |
| 2,554,190 | Hennessey | May 22, 1951 |
| 2,565,449 | Emrick | Aug. 21, 1951 |
| 2,611,527 | Fisher | Sept. 23, 1952 |
| 2,713,450 | Williamson | July 19, 1955 |